(12) United States Patent
Satchell, Jr. et al.

(10) Patent No.: US 6,244,854 B1
(45) Date of Patent: Jun. 12, 2001

(54) BURNER AND COMBUSTION METHOD FOR THE PRODUCTION OF FLAME JET SHEETS IN INDUSTRIAL FURNACES

(75) Inventors: Donald Prentice Satchell, Jr., Berkeley Heights, NJ (US); Christian Juan Feldermann, Sheffield (GB)

(73) Assignee: The BOC Group, Inc., New Providence, NJ (US)

( * ) Notice: Subject to any disclaimer, the term of this patent is extended or adjusted under 35 U.S.C. 154(b) by 0 days.

(21) Appl. No.: 09/311,425

(22) Filed: May 13, 1999

(51) Int. Cl.[7] .................. F23L 5/00; F23M 3/02
(52) U.S. Cl. .................. 431/8; 431/9; 431/181; 431/350; 431/354; 431/185; 239/403
(58) Field of Search .................. 431/8, 9, 115, 431/116, 354, 353, 351, 181, 174, 178, 187, 10, 188, 350, 185; 239/403, 423, 434.5, 399; 60/749

(56) References Cited

U.S. PATENT DOCUMENTS

| | | | |
|---|---|---|---|
| 3,630,412 | * 12/1971 | Capener | 239/1 |
| 3,984,528 | * 10/1976 | Cheng et al. | 431/8 |
| 4,226,087 | * 10/1980 | Spadaccini | 60/749 |
| 4,428,727 | * 1/1984 | Deussner et al. | 431/187 |
| 4,631,023 | * 12/1986 | Courrege | 431/354 |
| 4,824,361 | * 4/1989 | McGill et al. | 431/202 |
| 4,830,604 | * 5/1989 | Korenberg | 431/158 |
| 5,129,333 | * 7/1992 | Frederick et al. | 431/284 |
| 5,238,396 | * 8/1993 | Yap | 431/354 |
| 5,346,390 | * 9/1994 | Slavejkov et al. | 431/8 |
| 5,545,031 | * 8/1996 | Joshi et al. | 431/8 |
| 5,575,637 | * 11/1996 | Slavejkov et al. | 431/8 |
| 5,611,582 | * 3/1997 | Slavejkov et al. | 431/8 |

* cited by examiner

Primary Examiner—Ira S. Lazarus
Assistant Examiner—Josiah C. Cocks
(74) Attorney, Agent, or Firm—Joshua L. Cohen; Salvatore P. Pace (57) ABSTRACT

This invention relates to a burner and a method of combustion for producing a flame jet sheet or sheets for various applications in industrial furnaces. The burner has at least one linear or curvilinear flame nozzle having a ratio of width to height of greater than unity in order to produce high velocity and high temperature flame jet sheet or sheets with a well defined geometry. The burner is capable of being scaled to various sizes for various industrial furnace applications due to its geometry.

52 Claims, 3 Drawing Sheets

BURNER AND COMBUSTION METHOD FOR THE PRODUCTION OF FLAME JET SHEETS IN INDUSTRIAL FURNACES

CROSS-REFERENCE TO RELATED APPLICATIONS none.

BACKGROUND OF THE INVENTION

This invention relates to an apparatus and method for the use of a high velocity and temperature injection lance to enhance the performance of industrial furnaces. This injection lance advantageously combines the traditional functions of burners and gas, liquid, or solid reagent injectors. Burners produce flames that are used as heating sources for high temperature industrial processes such as the melting of glass or metals. Injectors advantageously add gaseous, liquid, or solid reagents to industrial processes for such purposes as the decarburization of stainless steel, for example. The injection lance of this invention uses linear or curvilinear flame nozzles to produce high velocity and high temperature flame jet sheets with a well defined geometry to more efficiently provide heat and/or reagents to industrial furnaces.

The term flame nozzle is commonly used to describe hand-held torches that produce high velocity, high temperature, and well-defined flame jets that are used in metal fabrication and spray deposition coating. These jets are often supersonic. A flame nozzle, at least partially, mixes oxidant and fuel, initiates combustion within a cavity, and then accelerates the burning gases through a nozzle to produce a well defined high velocity flame jet.

A burner either feeds fuel and oxidant separately (a tip mixed burner) or feeds a fuel and oxidant mixture (a premixed burner) to a flame ignition source in order to produce a flame envelope. The velocity of these gases must be less than the flame velocity in order for the flame to be able to propagate along the flame jet axis from a downstream ignition source. When the gas velocity is greater than the flame velocity, then the flame envelope 'lifts off' the burner tip and is reestablished when the velocity of the combustion gases decreases to velocity that is equal to or less than the flame velocity.

If excessive combustion occurs before the hot gases pass through a flame nozzle, the nozzle body may overheat. U.S. Pat. No. 4,067,686 patent sets forth a method to produce a core of very hot burning gases located within a layer of high velocity gas in order to protect the conical flame nozzle. U.S. Pat. No. 4,653,692 describes a torch nozzle in which the fuel is introduced upstream of the oxidant which then mixes in a turbulent zone and homogenizes in a homogenizing zone inside the conical nozzle. U.S. Pat. No. 5,343,693 describes an approach to change the relative position of the premixed injection slot and conical flame nozzle in such a manner that the flow speed of the premixed gas can be maintained substantially constant even if the premixed gas flow rate is changed and, accordingly, prevent backfire or blow out of a flame. There is, however, a problem scaling-up these conical nozzles. The flow rate of gas leaving a nozzle increases roughly with the square of the nozzle diameter and the area for flame initiation, represented by a surface parallel to the cone, is roughly proportional to the nozzle diameter. It becomes, therefore, progressively more difficult to initiate combustion in the region of the flame nozzle with increasing flame nozzle diameter and throughput.

In the case of the conical flame nozzles, e.g. U.S. Pat. Nos. 4,067,686, 4,653,692, the gas fuel passage, gas oxidant passage, and flame nozzle are roughly coaxial, the flame is propagated in a zone between the fuel nozzle and the flame nozzle along a conical path that is roughly collinear with the gaseous fuel and gaseous oxidant flow path with a progressively decreasing cross sectional area. As a result, there is an optimum fuel nozzle to flame nozzle distance that is a complicated function of the flame nozzle diameter, fuel and oxidant feed velocities, flame velocity, and stoichiometry.

For larger scale flame nozzles, the prior art teaches use of super stoichiometric combustion rather than short residence time to control the nozzle temperature. For example, U.S. Pat. No. 5,266,024 teaches production of a high velocity and high temperature oxygen jet by mixing greater than 80% excess oxygen ($CH_4+(2+\alpha)O_2 \rightarrow CO_2+2H_2O+\alpha O_2$, where $\alpha>1.6$) and fuel in a stage wise manner in a stage wise manner in a mixing chamber and allowing the hot oxygen combustion gases stream to exit the chamber at a velocity greater than 200 feet per second. U.S. Pat. No. 5,533,331 teaches a similar approach for missile divert thrusters and attitude control thrusters. U.S. Pat. No. 4,549,866 teaches the addition of excess oxidant to the nozzle combustion chamber and discharge of this excess oxygen from separate nozzles in a cone from the flame nozzle. However, these strategies do not allow the production of large, high temperature, and high velocity flame jets that could be useful in industrial furnaces.

Rocket engines comprise the most common example of large scale flame nozzles. Rocket engines typically overcome the drawbacks of the aforementioned prior art by using plurality of fuel and oxidant inlets, e.g. U.S. Pat. Nos. 5,438,834, 5,557,928, 5,704,551 to solve the scaling problem and by using very complex nozzle cooling systems, e.g. U.S. Pat. Nos. 4,109,460, 5,557,928, 5,619,851, 5,683,033, and 5,832,719 to provide the required cooling. These techniques, however, have not proven to be appropriate for industrial process due their inherent high cost and long term reliability problems.

Flame jet nozzles have found use for the production of thermal spray coatings. Very high rate of heat and momentum transfer are required to produce high quality coatings. U.S. Pat. Nos. 4,562,961, 4,678,120, 4,836,447, 4,999,225 teach various approaches to have particles entrained into high velocity flame jets from cylindrical flame nozzles by contacting the particles with the exterior of the cylindrical flame jet. These particles could be heated and accelerated much more rapidly if the particles could be fed to the center of the flame jet. However, with conical flame jet nozzles, the particles would certainly cause nozzle erosion problems. U.S. Pat. No. 5,384,164 uses a supersonic flame jet to melt a metallic wire feed and accelerate the molten metal.

Conventional oxygen cutting nozzles use high velocity oxygen jets in conjunction with a pre-mixed or tip mixed flame to cut steel plate. U.S. Pat. No. 4,344,606 teaches an approach to increase the cutting efficiency by having the oxygen jet intersect with the flame jet prior to contacting the steel plate.

In co-pending U.S. patent application Ser. No. 09/053,112 a particulate injection burner is disclosed which uses separate gaseous fuel and gaseous oxidant outlets to produce a mixture of gaseous fuel and gaseous oxidant in a chamber upstream of a converging and diverging flame nozzle. The mixture of fuel and oxygen is accelerated through a converging and diverging nozzle prior to combustion.

The prior art flame nozzles have not provided a burner for larger scale industrial applications which offers the scaled-up size necessary for industrial furnaces without encountering problems of overheating without resorting to complex, costly or constrained designs. Nor does the prior art teach a practical approach to produce multiple coaxial flame jets. Finally, the prior art does not disclose a burner in which the reagents are not required to flow through flame envelopes or flame jets.

BRIEF SUMMARY OF INVENTION

This invention provides a practical solution to each of these problems by having an oxidant flow passage and a fuel flow passage in fluid flow communication with a combustion chamber wherein combustion of the oxidant and fuel after ignition by an igniting means and propagates through one or more linear or curvilinear converging and diverging flame nozzles, preferably De Laval type nozzles, to produce one or more linear or curvilinear flame jet sheets. The flame nozzle has a ratio of width to height greater than unity.

The width of the linear or curvilinear flame nozzle can be increased without limit because both the area for flame initiation within the combustion chamber inside the nozzle and the cross sectional area of the nozzle are both linear functions of nozzle width. Furthermore, a burner according to the present invention can include a plurality of linear flame jet nozzles to increase the area covered by the flame jet sheets.

Thus the present invention provides for a method of producing one or more flame jet sheets from a burner having a combustion chamber by introducing a fuel stream and oxidant stream into the combustion chamber whence combustion is initiated and the combustion gases and any remaining oxidant and fuel are accelerated through a converging/diverging nozzle in fluid flow communication with said combustion chamber wherein said converging/diverging flame nozzle has a ratio of width to height of greater than unity.

Additionally, to feed gaseous, liquid or solid reagents into an industrial furnace, the burner apparatus may have a coaxial assembly consisting of a central cylindrical jet or flame jet to produce a central jet or flame jet inside the linear or curvilinear flame jet sheets. This assembly provides the basis for novel methods to introduce heat and or reagents into industrial furnaces.

DETAILED DESCRIPTION OF THE INVENTION

Figure 1:
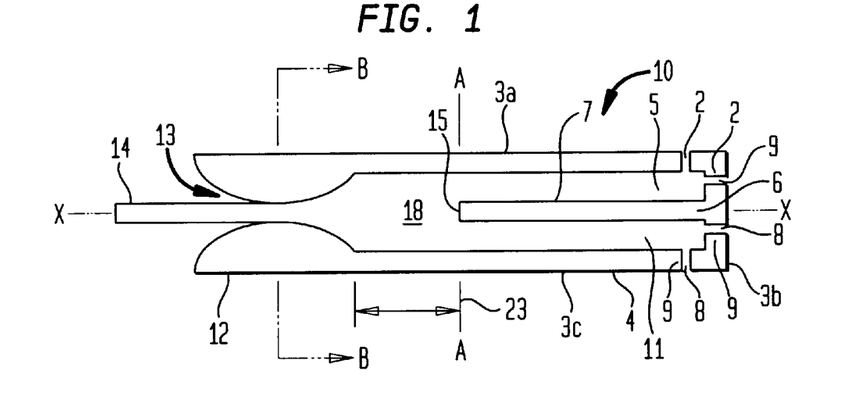
FIG. 1 is a cross-sectional view along the axis of a closed-end linear or curvilinear flame nozzle according to the present invention.

FIG. 1 is a cross-sectional view along the main axis X—X of a lance 10 according to the present invention. A gaseous fuel stream 1 enters through a fuel nozzle (or nozzles) 2 through the side wall 3a of conduit 4 near the proximal end of the conduit 4 or through the end-portion 3b of conduit 4 and is in flow communication with a gaseous fuel flow passage 5 defined by side wall 3a, end portion 3b and partition 7. The proximal end 6 of the partition 7 between the fuel flow passage 5 and the oxidant flow passage 11 forms a gas impervious seal with the end portion 3b of conduit 4. Likewise, a gaseous oxidant stream 8 enters through a separate oxidant nozzle (or nozzles) 9 or nozzles through the side wall 3c of conduit 4 near proximal end of the conduit 4 or through the end-portion 3c of the proximal end of conduit 4 in flow communication with the oxidant flow passage 11. The oxidant flow passage 11 also extends from the proximal end 6 of partition 7 to the distal end 15 and is bounded by the side-wall 3c of conduit 4 and the end-portion 3b of conduit 4.

The distal end 15 of partition 7 serves as a terminus for both the fuel flow passage 5 and oxidant flow passage 11 where a combustion cavity 18 begins and wherein combustion of the fuel stream 1 and oxidant stream 8 occurs in order to produce a flame. Distal end 15 of partition 7 also produces a recirculation zone which anchors the flame at or near the distal end 15.

The shape of the distal end 15 of partition 7 can be used to control mixing intensity of the fuel stream 1 and the oxidant stream 8 in the region of the combustion cavity 18 near distal end 15 of partition 7. FIGS. 7A–7D depict various cross-sectional configurations for partition 7 and the distal end 15 thereof. More intense mixing increases the operable flow rates of fuel stream 1 and oxidant stream 8, which is advantageous. More intense mixing, however, also increases the heat released to the linear or curvilinear flame nozzle 12, which is generally disadvantageous. Increasing the thickness of distal end 15 of partition 7 as depicted by distal end 15b of FIG. 7B in comparison to distal end 15a of FIG. 7A increases the mixing intensity. A more aerodynamic shape as depicted by distal end 15d of FIG. 7D relative to the distal ends 15a or 15c of FIGS. 7A or 7C decreases the mixing intensity. As appreciated by one skilled in the art, the shape of distal end 15 of partition 7 will be determined by the oxidant and fuel characteristics and the process requirements.

An ignition source 13 is required to initiate combustion either inside or outside the combustion cavity 18. One skilled in the art will appreciate that there are several different approaches which can be used to ignite the mixed fuel stream 1 and oxidant stream 8 in combustion cavity 18. One preferred method would be to initially provide fuel stream 1 and oxidant stream 8 at low flow rates allowing both streams to pass through the flame nozzle 12. After both streams have passed through the flame nozzle 12 the mixture of fuel stream 1 and oxidant stream 8 is ignited with any conventional ignition source 13 to generate a flame. The flame propagates from ignition source 13 back through the flame nozzle 12 to the portion of the combustion cavity 18 near distal end 15 of partition 7. After initial propagation of the flame the flow rates of fuel stream 1 and oxidant stream 8 are increased to their desired values. In order for this ignition technique to be successful, the effective flame velocity must be greater than the fuel and oxidant velocity in the narrowest portion of the flame nozzle 12 indicated by section line B—B in FIG. 1.

As an alternative source of ignition one could install a conventional spark-type ignition source at any lateral position near the distal end 15 of partition 7. The flame would propagate laterally along the distal end 15. In addition, one could also install retractable or redundant ignition sources to increase reliability.

The average velocity or flow rate of the fuel stream in the fuel flow passage 5 and the oxidant stream in the oxidant flow passage 11 must be less than the effective flame velocity in order to maintain a flame within the combustion cavity 18 in the region near the distal end 15 of partition 7. This effective flame velocity can be estimated mathematically based on the properties of the fuel and oxidant and the operating conditions of the injection burner. The effective flame velocity, however, can be experimentally determined, which is the preferred method. The flow rate of the fuel stream 1 and oxidant stream 8 are increased until the flame exits the combustion cavity 18 and the burner 10 ceases to operate. In order to maintain the flame within the combustion cavity the average flow rate of the fuel stream 1 and oxidant stream 8 should be less than 80% of the effective flame velocity. More preferably, the flow rates should be less than 50% of the effective maximum flame velocity.

The preferred fuel is gaseous and can be any mixture of hydrogen, carbon monoxide, hydrogen sulfide, ammonia, hydrocarbon species with seven or less carbons per atom and may include some amount of certain non-flammable species. The most preferred gaseous fuel is methane. Typical non-flammable species include any mixture of nitrogen, argon, carbon dioxide, carbon tetrachloride, water vapor, hydrogen chloride, and other halogen gases. The preferred oxidant is gaseous and typically contains molecular oxygen or chlorine. Typical gaseous oxidants include air, oxygen enriched air, or substantially pure oxygen. Substantially pure oxygen has an oxygen content greater than 70 volume percent, preferably greater than 80 volume percent, more preferably greater than 90 volume percent. The latter being the most preferred gaseous oxidant.

In addition to providing an ignition source for combustion necessary to generate the flame jet sheet, the flame in the region of combustion cavity 18 near distal end 15 of partition 7 preheats the fuel and oxidant which will create the flame jet 14. The gases entering the convergent divergent flame nozzle 12 preferably have an extent of combustion ($\beta$) greater than 0.5, preferably greater than 0.75. The velocity of the gases exiting the flame nozzle 12 preferably have a velocity greater than 700 meters per second and more preferably greater than sonic velocity. The average temperature of the gases from the combustion cavity 18 entering the flame nozzle 12 is preferably between 600 and 3000° C., more preferably between 700 and 2000° C., and most preferably between 1000 and 1500° C. The average temperature of the gas entering the flame nozzle 12 is primarily controlled by controlling the extent of combustion in the combustion cavity 18. The extent of combustion is a complicated function of the velocities in the fuel flow passage 5 and oxidant flow passage 11, the design of the distal end 15 of partition 7, and the distance 23 between the distal end 15 of partition 7 and the proximal end of flame nozzle 12. Reaction 1 sets forth the relationship between the extent of the combustion ($\beta$), combustion overall stoichiometry ($\chi$), and the adiabatic temperature of the gases entering the convergent and divergent nozzle using methane and oxygen as examples for the gaseous fuel and oxidant:

$CH_4(g)+2_\chi O_2(g) \rightarrow \beta CO_2(g)+2\beta H_2O(g)+(1-\beta)$ $CH_4(g)+2$ $(\chi-\beta)$ $O_2(g)$ $(\chi>\beta)+tm$ (1)

For generation of a stoichiometric flame jet sheet 14, the value of $\chi$ is roughly unity. For generation of a super stoichiometric flame jet sheet 14, the value of $\chi$ is significantly greater than unity. For generation of a sub-stoichiometric flame jet sheet, the value of $\chi$ is significantly less than unity. Reaction 1 assumes stoichiometric combustion ($\chi$=1) in the combustion cavity 18 and additionally assumes that the combustion products and any remaining fuel or oxidant exit the fuel nozzle 12 without further reaction or dissociation. The adiabatic temperature of the products of Reaction 1 can be calculated by heat balance using standard techniques. Reaction 1 is offered as one illustration of the combustion possible with a burner constructed according to the present invention and to provide an unequivocal basis to interpret the operating ranges for this invention. It should be understood that the skilled burner/lance designer could use more complicated and realistic design methods and modeling that would be tailored to meet the specific needs of the application.

Figure 3:
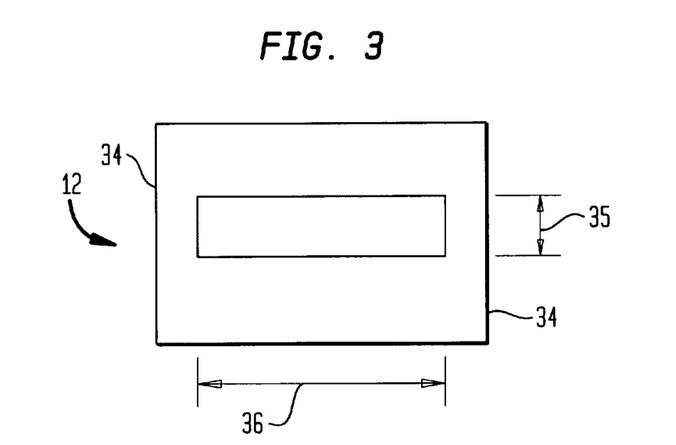
FIG. 3 is a cross-sectional representation of a linear flame nozzle according to FIG. 1 through line B—B.

A novel aspect of the present invention is a large width to height ratio for converging/diverging flame nozzle 12. The height 35 of the flame nozzle 12 is defined as the minimum separation of the converging/diverging nozzle 12 seen at sectional line B—B of FIG. 1 as shown in FIG. 3. The separation of the converging/diverging nozzle 12 is substantially across the width of the nozzle. The width of a closed-end linear flame nozzle 12 is the distance 36 between the two ends 34 depicted in the cross-sectional view of FIG. 3 measured along the centerline at the point of minimum separation (B—B section on FIG. 1) of the linear flame nozzle. For a closed-end curvilinear flame nozzle, the width is the actual distance measured as along the curvilinear centerline. For a closed-end curvilinear burner it is not the straight line distance between the closed ends.

Figure 4:
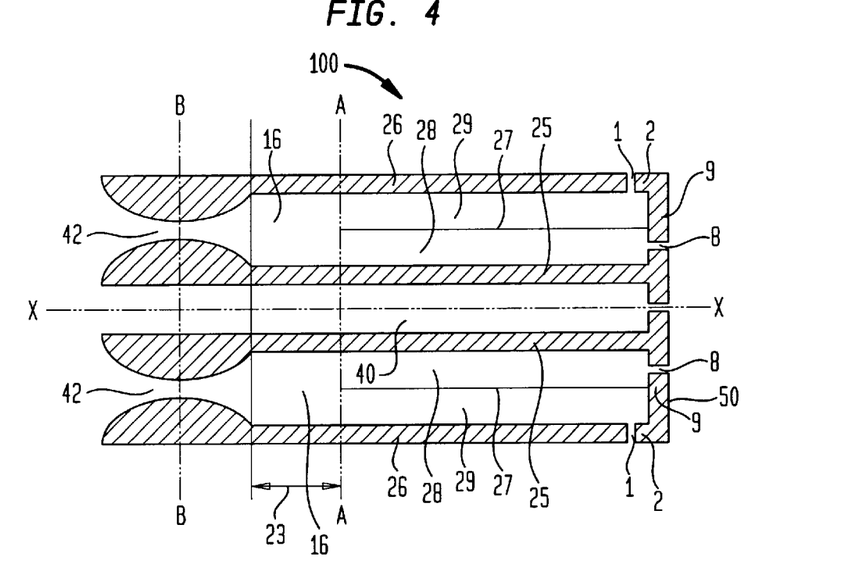
FIG. 4 is a cross-sectional view along the axis of an open-end curvilinear flame nozzle according to the present invention.
Figure 5:
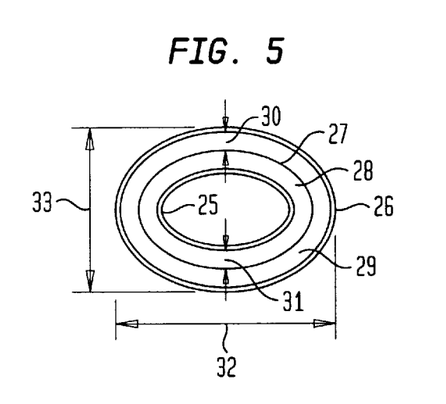
FIG. 5 is a cross-sectional representation of a curvilinear flame nozzle according to FIG. 4 through line A—A.
Figure 6:
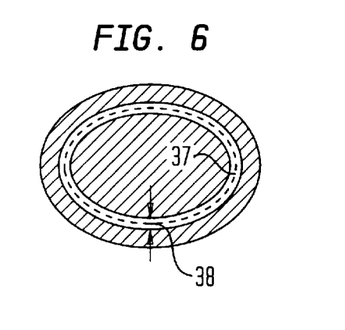
FIG. 6 is a cross-sectional representation of curvilinear flame nozzle according to FIG. 4 through line B—B.
Figure 7A:
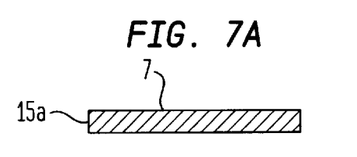
FIGS. 7A–7D depict various geometrical configurations for the distal end of the internal nozzle partition.
Figure 7B:
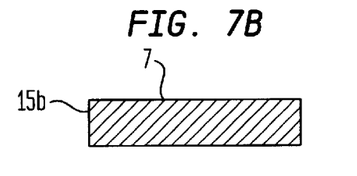
Figure 7C:
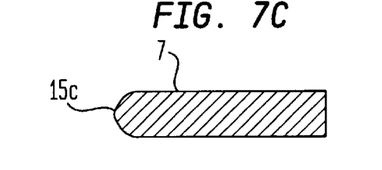
Figure 7D:
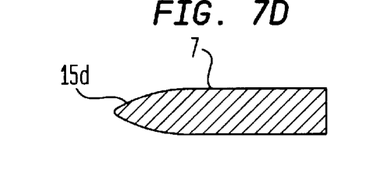

For an open-end curvilinear flame nozzle as depicted in FIGS. 4–6, the height 38 is the minimum height of the converging and diverging nozzle measured along the minor axis of cross-section of the burner 100 taken at line B—B in FIG. 4. The width for an open end curvilinear flame nozzle is the distance measured along the centerline 37 at the point of minimum separation (B—B section on FIG. 4) of the curvilinear flame nozzle measured from any point along that centerline 37 and ending at the same point. This curvilinear nomenclature is used so that the link between the closed-end linear or curvilinear nozzles and the open-ended curvilinear nozzle can be understood. The open-ended curvilinear nozzle is essentially a flat linear nozzle in which the closed ends have been removed and the now open ends are brought around to meet. Such an open-ended curvilinear nozzle also could be described as a cylindrical nozzle. Conventional conical flame nozzles, however, have a width to height ratio essentially equal to unity, i.e., the ratio of the width to the height of the circular opening at the minimal point of divergence. The closed-end linear and curvilinear flow nozzles 12 and open-ended curvilinear flow nozzle 42 of the present invention have width to height ratios greater than unity, preferably greater than 5/1, preferably greater than 10/1, and more preferably greater than 20/1.

Another novel aspect of the present invention is a large width to height aspect ratios for the fuel flow passage 5, i.e., the ratio of width 21 to height 19, and the oxidant flow passage 11, i.e., the ratio of the width length 21 to height 20. The width to height aspect ratio is preferably greater than 2, more preferably greater than 4.

In the prior art, conical flame nozzles, as discussed above, have gas fuel passages, gas oxidant passages, and flame nozzles that are roughly coaxial and the flame is propagated in a zone between the fuel nozzle and the flame nozzle along a conical path that is roughly collinear with the gaseous fuel and gaseous oxidant flow path with a progressively decreasing cross sectional area resulting in an optimum fuel nozzle to flame nozzle distance that is a complicated function of the flame nozzle diameter, fuel and oxidant feed velocities, flame velocity, and stoichiometry. The advantages of the linear or curvilinear flame nozzle of the present invention are based on the facts that the distal end 15 of partition 7 and flame nozzle 12 are both rectangular shaped, rather than having the annular partition and circular nozzle shapes of the prior art. The distal end 15 of partition 7 and flame nozzle 12 have very large aspect ratios (typically greater than 10) rather than the aspect ratios near unity for the conventional fuel line and flame nozzle. The distal end 15 of partition 7 and flame nozzle 12 run perpendicular to fuel flow passage 5 and oxidant flow passage 11 rather than roughly parallel flow path and nozzle arrangement of the prior art.

These differences result in very important difference in the ability to scale-up the operating sizes of the burner 10 having a linear or curvilinear flame nozzle 12. For example, many of the most important operating conditions are based on intensive variables rather than extensive variables. These intensive variables are, by definition, independent of scale. For example, the design of the distal end 15 of partition 7 and the velocities in the fuel flow passage 5 and oxidant flow passage 11 primarily determine the characteristics of the recirculation zone in the combustion cavity 18 near the distal end 15 of partition 7. As a result, the incipient flame in this recirculation zone is essentially independent of the flow rates of fuel stream 1 and oxidant stream 8 and, thus, the flame can propagate along the length of the flame nozzle 12, unlike the prior art. Thus, this invention limits the flame envelope to a combustion cavity 18 that extends between the distal end 15 of partition 7 and the flame nozzle 12. This invention uses this geometry to stabilize the incipient flame near the distal end 15 of partition 7 to produce a combustion ignition source in the flow region between fuel-rich and oxidant-rich regions of the gas flowing between distal end 15 of partition 7 and the flame nozzle 12. The area of the nozzle can be conventionally increased, without effecting these operating conditions simply by increasing the width of the nozzle as defined herein of the converging-diverging flame nozzle 12. This converging and diverging flame nozzle 12 is used to intensely mix and accelerate the fuel, oxidant, and burning gases to produce a high velocity flame jet sheet 14.

Many of the specifications of the linear or curvilinear flame jet nozzle 12 of the present invention are independent of the nozzle area. Essentially, the cross-sectional area and capacity of the flame nozzle is preferably increased by increasing its width, which has virtually no effect on the linear or curvilinear flame nozzle operation.

The preferred linear flame nozzle design specifications are in the following ranges. The height 22 of the distal end 15 (or 15a, 15b, 15c or 15d) of partition 7 should be less than 40% of the sum of the height 19 of the fuel flow passage 5 and the height 20 of the oxidant flow passage 11, more preferably less than 30%, and most preferably less than 20%. The ratio of the velocity of the fuel in fuel flow passage 5 to the velocity of the oxidant in the oxidant flow passage 11 should be either less than 5/1 or greater than 1/5, more preferably less than 3/1 or greater than 1/3, and most preferably less than 2/1 or greater than 1/2. The distance 23 between the distal end 15 of partition 7 and the proximal end of flame nozzle 12 should be less than five times sum of the height 19 of the fuel flow passage 5, height 22 of the distal end 15 of partition 7 and height 20 of the oxidant flow passage 11, more preferably less than twice this sum, most preferably less than 50% of this sum. The area of the nozzle can be conventionally increased without effecting these operating conditions by just increasing the width of the converging-diverging flame nozzle 12.

Figure 2:
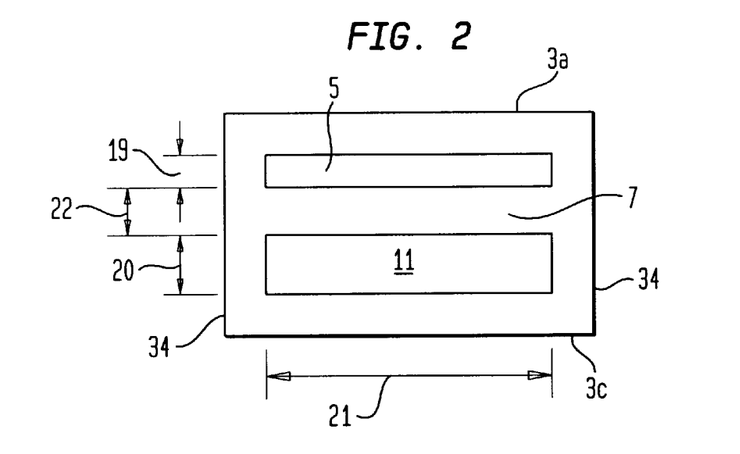
FIG. 2 is a cross-sectional representation of a linear flame nozzle according to FIG. 1 through line A—A.
Figure 9:
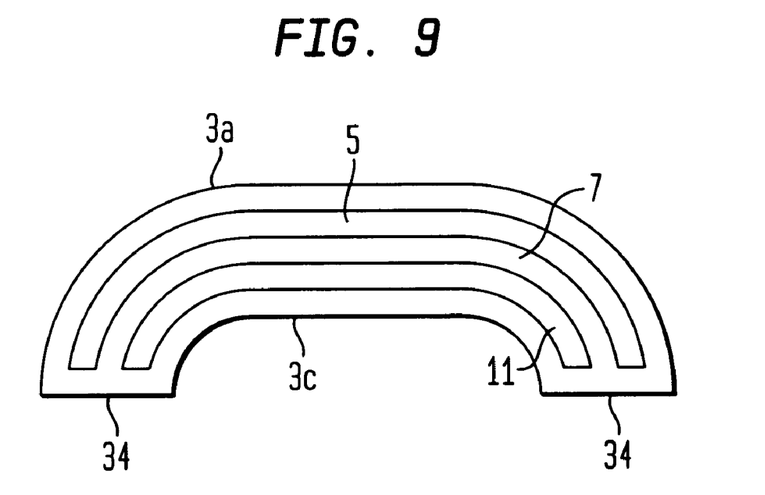
FIG. 9 is a cross-sectional representation of a curvilinear flame nozzle according to FIG. 1 through line A—A.

The cross-sectional view of linear flame nozzle 12 of FIGS. 2 and 3 with closed ends 34 generates a flame jet sheet in a substantially flat plane. A curvilinear flame nozzle with as illustrated in FIG. 9 generates a flame jet sheet having a curved flat surface. A curvilinear flame nozzle with open ends forms a flame jet defined by a cylinder and such a burner is shown in FIG. 4. Burner 100 is essentially equivalent to burner 10 with the ends 34 removed so that the linear burner 10 could be bent into a cylinder wherein the now open ends meet forming an open-ended curvilinear burner. Thus, there is an annular (or orbicular) space which creates an oxidant flow passage 28 and a second annular (or orbicular) space which creates a fuel flow passage 29. Oxidant flow passage 28 is in flow communication with one or more oxidant nozzles 9 thereby enabling an oxidant stream 8 to enter and flow therein. Likewise, fuel flow passage 28 is in flow communication with one or more fuel nozzles 2 thereby enabling a fuel stream 1 to enter and flow therein. The oxidant flow passage 28 and the fuel flow passage 29 may also be used for the flow of fuel and oxidant, respectively.

Oxidant flow passage 28 is defined by inner annular wall 25, end wall 50, and annular partition 27. Fuel flow passage 29 is defined by outer annular wall 26, end wall 50 and annular partition 27. Both the fuel flow passage 29 and the oxidant flow passage 28 are in flow communication with combustion chamber 16.

FIGS. 5 and 6 illustrate cross-sections of the burner 100 taken through section lines A—A and B—B respectively. In order to decrease material costs by using standard pipes and in order to decrease machining costs, the length of the major axis 32 is usually made equal to the length of the minor axis 33. The open-end curvilinear flame nozzle utilizes substantially axisymmetric annular conduit or conduits for interior annular wall 25, equivalent to either 3a or 3c in the closed-end linear or curvilinear nozzle of FIGS. 1, 2 and 9, respectively, an outer annular wall 26, also equivalent to either 3a or 3c in the closed-end linear or curvilinear nozzle of FIGS. 1 and 2, which are partially subdivided by an annular partition 27, equivalent to partition 7 in the closed-end linear or curvilinear nozzle. The annular partition 27 divides the annular conduit formed by 25 and 26 into a fuel flow passage 29 and an oxidant flow passage 28. Either passage 28 or 29, however, could be used for flow of oxidant or fuel. The width 30 of the flow passage 29, the thickness of annular partition 27 and the width 31 of the flow passage 28 are measured along the minor axis of the cross-section of burner 100. The design of the curvilinear flame nozzle with open ends conforms to all above criteria and the following additional criteria. The interior annular wall 25, outer annular wall 26, and annular partition 27 are substantially axisymmetric. The height 33 along the minor axis of the cross section of burner 100 is greater than 2.25 times the sum of widths 30 and 31 and the thickness of partition 27. The ratio of the width 32 of the major axis of the cross section of burner 100 to the height 33 of the minor axis is greater than or equal to unity.

An assembly of open ended curvilinear flame nozzles can be produced by a series of substantially axisymmetric flow passages like flow passages 28 and 29 with either separate inner 25 and outer 26 annular walls for adjacent curvilinear flame nozzles or a common wall for the outer annular wall 26 for the more central flame nozzle and the inner annular wall 25 for the peripheral flame nozzle. All the adjacent curvilinear flame nozzles should be substantially axisymmetric. The fuel nozzles 2 for each curvilinear flame nozzle may be connected to an appropriate fuel distribution manifold. Likewise, oxidant nozzles 9 may be connected to an appropriate oxidant distribution manifold. This arrangement will result in a set of flame jets having a substantially circular cross section nested one inside the other and sharing a common center and central axis.

A central nozzle 40 is advantageously added to the curvilinear flame nozzle with open ends or assembly concentric curvilinear flame nozzles with open ends. The central nozzle could be a simple axisymmetric cylindrical conduit, simple cylindrical conduit with a convergent nozzle at the distal end, a simple cylindrical conduit with a converging diverging nozzle at the distal end, a cylindrical conduit that is partially subdivided by a partition pipe to yield a central flow passage and annular flow passage with separate feed inlets for each flow passage. The central nozzle 40 centered around axis X—X provides a means for introducing a central gas stream with or without entrained particulates. The gas stream could provide additional source of oxidant or fuel or it could be comprised of an inert gas such as nitrogen, argon or carbon dioxide. As discussed below, the central nozzle can also be used for liquid fuel. The central nozzle 40 may terminate at or near the distal end of the burner in a converging nozzle or a converging/diverging nozzle such as a De Laval nozzle.

Figure 8:
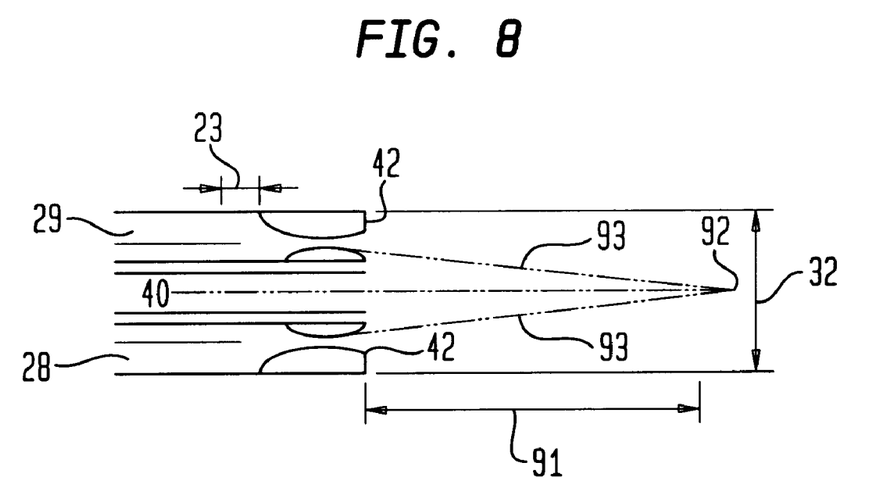
FIG. 8 is a cross sectional diagram of a burner according to the present invention depicting the point of intersection of a central jet and the flame jet.

FIG. 8 is a cross-sectional representation of an open-ended curvilinear burner 400 having a central liquid fuel feed. The curvilinear particulate injection lance consists of an oxidant flow passage 29 and a fuel flow passage 28. The oxidant is preferably a substantially pure oxygen, preferably contain more than 70 volume percent oxygen, more preferably more than 80 volume percent oxygen, and most preferably more than 90 volume percent oxygen. The gaseous fuel could contain hydrogen, hydrogen sulfide, ammonia, carbon monoxide, or hydrocarbon species with an average of seven or less carbon atoms per molecule in any proportion. The gaseous fuel may also contain some non-flammable gaseous species such a nitrogen, argon, carbon dioxide, carbon tetrachloride, water vapor, or other halogen containing species. However, the preferred embodiment is to minimize the concentration of non-flammable components in the gaseous fuel feed. The maximum velocity of the gaseous oxidant or gaseous fuel in the flow passages 28 and 29 should be less than eighty percent of the effective flame velocity and their velocity ratios should be either less than 5/1 or more than 1/5. The gases entering the convergent and divergent flame nozzle 42 preferably has an extent of combustion ($\beta$) greater than 0.5, preferably greater than 0.75. The gases entering the convergent divergent flame nozzle 42 have a theoretical adiabatic temperature that is preferably greater than 600° C. and less than 3000° C., more preferably greater than 700° C. and less than 2000° C. From a practical viewpoint, the distance 23 between the distal end of and the flame nozzle 12 would be lengthened, to achieve these goals. Then, the resulting mixture of primarily gaseous oxidant and combustion products, with much lower concentration of unburned gaseous fuel components, are accelerated through the flame nozzle 42, The velocity of the gases at the narrowest point in the convergent and divergent nozzle should approach sonic velocity. Sonic velocity of the flame jet in the throat of the convergent and divergent flame nozzle 42 is a strong function of the temperature of the gases entering the convergent and divergent nozzle. Equation (2), (3), and (4) are standard equations that very roughly estimate the performance of a well designed flame jet nozzle, and the conditions in the throat of the nozzle, denoted by the subscript 1, based on the inlet conditions, denoted by subscript 0, and the down stream conditions, denoted by the subscript 2. The prior art provides much more accurate, and more complicated, equations to estimate the performance of flame jet nozzles. These equations provide an imperfect, but unequivocal basis, to interpret the preferred operating ranges for this invention.

$$V_{c1} \approx \sqrt{\frac{2g_c kRT_0}{M_0(k+1)}} \approx \sqrt{\frac{9{,}703 T_0}{M_0}} \text{ meters/second} \quad (2)$$

Where, $V_{c1}$≡sonic velocity in throat of nozzle $$g_c = \left[\frac{9.805 \,(m)(gm_m)}{(gm_f)(\sec^2)}\right] = \text{gravitational constant}$$

m≡meters $gm_m$≡gram mass
$gm_f$≡gram force
sec≡second
$k = c_p/c_v \approx 1.4$ $$c_p = \text{heat capacity at constant pressure,} \; \frac{(gm_f)(m)}{gm\text{-mole}}$$

$$c_v = \text{heat capacity at constant volume,} \; \frac{(gm_f)(m)}{gm\text{-mole}}$$

gm-mole≡gram moles of gas $$R = \text{gas constant} = \frac{848.2 \,(m)(gm_f)}{(^\circ K.)(gm\text{-mole})(\sec^2)}$$

$T_o$≡gas temperature entering nozzle, °K.

MO≡gas molecular weight, $gm_m$/gm-mole $$\left[\frac{A_{1c}}{A_2}\right]^2 = \left[\frac{2}{(k-1)}\right]\left[\frac{k+1}{2}\right]^{\left[\frac{(k+1)}{(k-1)}\right]}\left[\frac{p_2}{p_0}\right]^{\left[\frac{2}{k}\right]}\left\{1 - \left[\frac{p_2}{p_0}\right]^{\left[\frac{k-1}{k}\right]}\right\} \quad (3)$$

Where, $$\left[\frac{p_2}{p_0}\right] \le \left[\frac{2}{(k+1)}\right]^{\frac{k}{k-1}}$$

$A_{c1}$=known nozzle throat area, m²
$A_2$=known nozzle discharge area, m²
$p_2$=known down stream pressure, bar
$p_o$=upstream pressure, bar The $p_2/p_o$ ratio is calculated, by trial and error, using Equation (3) with the known value for the nozzle area ratio, $A_{1c}/A_2$. Then, the exit velocity can be estimated using Equation (4)

$$\left[\frac{V_2}{V_{1c}}\right]^2 = \left[\frac{k+1}{k-1}\right]\left\{1 - \left[\frac{p_2}{p_0}\right]^{\left[\frac{(k-1)}{k}\right]}\right\} = [nozzle\ Mach\ number]^2 \quad (4)$$

The flame jet 93 can either be parallel or converging on the fuel stream from nozzle 40 along the central axis of the burner. The path of the flame jet 93 is preferably converging on the fuel stream from nozzle 40. The distance 91 of the theoretical impingement point 92 of the flame jet 93 and the fuel stream from nozzle 40 is less than 20 times the length of the major axis 32 of the burner, preferably less than 10 times, more preferably less than 5 times.

Since the kinetic energy and temperature of the oxygen rich flame jet is very high, it can be used to initiate combustion with a very broad range of fuels, including many very difficult to handle materials. A non-gaseous fuel is a general feed classification for the central nozzle 40. The non-gaseous fuel may be a liquid fuel, liquid fuel-solid fuel slurry, an non fuel liquid-solid fuel slurry, liquid fuel-non fuel solid slurry, solid fuel-non fuel gas suspension, or solid fuel-gaseous fuel suspension. Typical liquid fuels would include petroleum derived residual oil, petroleum or coal derived liquids with an average of five or more carbons per molecule, sewage sludge, by-products from hydrocarbon process plants (e.g. pyrolysis tar from ethylene plants), waste oils (e.g. used lubricants or hydraulic fluids), liquid elemental sulfur, or similar material. The liquid fuel may contain some non-flammable liquids (e.g. water and silicates), flame retardants (e.g. halogen containing compounds), or similar material. Typical liquid fuel-solid fuel slurries could include any of the above typical liquid fuels and any, or any mixture, of the following solid fuels: coal, sulfur, carbon, petroleum coke, coal char, metallurgical coke, ferrous and non-ferrous sulfide ores, carbon rich bag house dust, carbon black, or similar material. Typical non fuel liquid-solid fuel slurry could include any of, or any mixture of, the above solid fuels and non-flammable liquids like water, silicates or similar material. Typical liquid fuel-non fuel solid slurries could include any of, or any mixture of, the above liquid fuels and non fuel solids, e.g. glass cullet, fine ferrous and nonferrous oxide ores, limestone powder, metal oxides, bag house dust with low carbon content, or similar material. Typical solid fuel-non fuel gas suspension could include any, or any mixture, of the above solid fuels and any, or any mixture, of the above non fuel gases. Typical non fuel solid-fuel gas suspension could include any of the above non fuel solids and gaseous fuels. Typical non fuel gases could be a pure stream or any mixture of nitrogen, argon, helium, carbon dioxide, hydrogen fluoride, carbon tetra fluoride, hydrogen chloride, sulfur dioxide, or similar material. Typical solid fuel-non fuel gas suspension would include any of, or any mixture of, the above solid fuels and non fuel gases.

We claim:

1. A burner having at least one fuel input and at least one oxidant input at its proximal end and a converging/diverging nozzle at its distal end comprising:
    a combustion chamber;
    a fuel flow passage extending from said fuel input to said combustion chamber for providing a fuel stream to said combustion chamber;
    an oxidant flow passage extending from said oxidant input to said combustion chamber for providing an oxidant stream to said combustion chamber;
    a partition separating said fuel flow passage from said oxidant flow passage wherein the distal end of said partition terminates at the proximal end of the combustion chamber;
    a converging/diverging De Laval flame nozzle having a ratio of width to height greater than approximately 5 and a Mach number greater than approximately 1.25 in fluid flow communication with said combustion chamber;
    an ignition means for controlled ignition of said fuel stream and said oxidant stream in said combustion chamber in order to produce a flame jet sheet from said converging/diverging flame nozzle.

2. The burner of claim 1 wherein said converging/diverging flame nozzle has a ratio of width to height greater than approximately 10.

3. The burner of claim 1 wherein said converging/diverging flame/nozzle has a ratio of width to height of greater than approximately 20.

4. The burner of claim 1 wherein the De Laval type flame nozzle has a Mach number greater than approximately 15.

5. The burner of claim 1 wherein the De Laval type flame nozzle has a Mach number greater than 2.0.

6. The burner of claim 1 wherein said converging/diverging flame nozzle is substantially linear with closed ends.

7. The burner of claim 6 having a plurality of converging/diverging flame nozzles wherein each said flame nozzle is substantially linear with closed ends.

8. The burner of claim 1 wherein said converging/diverging flame nozzle is curvilinear with closed ends.

9. The burner of claim 8 having a plurality of converging/diverging flame nozzles wherein each said flame nozzle is substantially curvilinear with closed ends.

10. The burner of claim 1 wherein the converging/diverging flame nozzle is substantially axisymmetric and curvilinear with open ends.

11. The burner of claim 10 having a plurality of converging/diverging flame nozzles wherein each said flame nozzle is substantially axisymmetric and curvilinear with open ends.

12. The burner of claim 10 wherein a first measurement of the burner along the major axis of a cross-section of the burner taken at the point of maximum convergence of the converging/diverging flame nozzle is less than 5 times a second measurement of the burner along the minor axis.

13. The burner of claim 12 wherein said first measurement is less than 2 times said second measurement.

14. The burner of claim 13 wherein said first and second measurements are essentially equal.

15. The burner of claim 1 wherein said ignition means is a conventional spark type ignition source near the distal end of the gaseous fuel and gaseous oxidant flow passages.

16. The burner of claim 1 wherein the distal end of said partition has an aerodynamic shape for decreasing the mixing intensity of the fuel stream and the oxidant stream.

17. The burner of claim 8 where a curvilinear partition separates an annular fuel flow passage from an annular oxidant flow passage.

18. The burner of claim 6 wherein a substantially linear partition separates a substantially linear fuel flow passage from a substantially linear oxidant flow passage.

19. The burner of claim 10 further comprising a central nozzle centered around the longitudinal axis of the burner.

20. The burner of claim 1 wherein the distance between the distal end of the fuel flow passage and the oxidant flow passage is less than five times the sum of the heights of the fuel flow passage, the oxidant flow passage and the partition.

21. The burner of claim 1 wherein the distance between the distal end of the fuel flow passage and the oxidant flow passage is less than two times the sum of the heights of the fuel flow passage, the oxidant flow passage and the partition.

22. The burner of claim 1 wherein the distance between the distal end of the fuel flow passage and the oxidant flow passage is less than half the sum of the heights of the fuel flow passage, the oxidant flow passage and the partition.

23. A method for producing a flame jet sheet from a burner having a combustion chamber comprising the steps of:
   introducing a fuel stream into a fuel flow passage in fluid flow communication with said combustion chamber;
   introducing an oxidant stream into an oxidant flow passage in fluid flow communication with said combustion chamber, said streams being separated prior to and mixing at said combustion chamber;
   initiating combustion of said oxidant stream and said fuel stream to generate combustion gases; and,
   accelerating the combustion gases and any remaining oxidant and fuel by passage through a converging/diverging De Laval flame nozzle having a ratio of width to height greater than approximately 5 and a Mach number greater than approximately 1.25 in fluid flow communication with said combustion chamber.

24. The method of claim 23 wherein the ratio of width to height of the converging/diverging flame nozzle is greater than 10.

25. The method of claim 23 wherein the De Laval nozzle has a Mach number greater than 1.5.

26. The method of claim 23 wherein the De Laval nozzle has a Mach number greater than 2.0.

27. The method of claim 23 wherein the flame jet sheet travels along a path substantially parallel with the longitudinal axis of the burner.

28. The method of claim 23 wherein the flame jet sheet travels along a path which converges toward the longitudinal axis of the burner.

29. The method of claim 28 wherein the intersection of the path of the flame jet sheet and the longitudinal axis of the burner is less than 20 times the width of the burner along the major axis of a cross section of the burner.

30. The method of claim 28 wherein the intersection of the path of the flame jet sheet and the longitudinal axis of the burner is less than 10 times the width of the burner along the major axis of a cross section of the burner.

31. The method of claim 28 wherein the intersection of the path of the flame jet sheet and the longitudinal axis of the burner is less than 5 times the width of the burner along the major axis of a cross section of the burner.

32. The method of claim 23 wherein said fuel stream comprises a gaseous fuel selected from the group consisting of hydrogen, carbon monoxide, hydrogen sulfide, ammonia, hydrocarbon species with seven or less carbons per atom and mixtures thereof.

33. The method of claim 32 wherein said fuel stream further comprises a non-flammable species selected from the group consisting of nitrogen, argon, carbon dioxide, carbon tetrachloride, water vapor, hydrogen chloride, other halogen gases and mixtures thereof.

34. The method of claim 23 wherein the oxidant stream comprises a gaseous oxidant selected from the group consisting of oxygen and chlorine.

35. The method of claim 34 wherein said oxygen stream is selected from the group consisting of air, oxygen enriched air, and substantially pure oxygen.

36. The method of claim 33 wherein the substantially pure oxygen has an oxygen content greater than 70 volume percent with balance primarily nitrogen and argon.

37. The method of claim 35 where the substantially pure oxygen has an oxygen content greater than 80 volume percent with balance primarily nitrogen and argon.

38. The method of claim 35 where the substantially pure oxygen has an oxygen content greater than 90 volume percent with balance primarily argon and nitrogen.

39. The method of claim 23 wherein the fuel stream is introduced into the fuel flow passage with a velocity that is between one-fifth and five times the velocity with which the oxidant stream is introduced into the oxidant flow passage.

40. The method of claim 23 wherein the fuel stream is introduced into the fuel flow passage with a velocity that is between one-third and three times the velocity with which the oxidant stream is introduced into the oxidant flow passage.

41. The method of claim 23 the fuel stream is introduced into the fuel flow passage with a velocity that is between one-half and two times the velocity with which the oxidant stream is introduced into the oxidant flow passage.

42. The method of claim 23 wherein said fuel stream and said oxidant stream are separated prior to and mixed at said combustion chamber by a partition separating the fuel flow passage from the oxidant flow passage with said partition having a distal end terminating at the combustion chamber, said method further comprising the step of adjusting the thickness of the partition to achieve the desired mixing of the fuel stream and the oxidant stream.

43. The method of claim 23 wherein said fuel stream and said oxidant stream are separated prior to and mixed at said combustion chamber by a partition separating the fuel flow passage from the oxidant flow passage with said partition having a distal end terminating at the combustion chamber, said method further comprising the step of adjusting the aerodynamic shape of the distal end of the partition to achieve the desired mixing of the fuel stream and the oxidant stream.

44. The method of claim 23 wherein said fuel stream and said oxidant stream are separated prior to and mixed said combustion chamber by a partition separating the fuel flow passage from the oxidant flow passage with said partition having a distal end terminating at the combustion chamber, further wherein the fuel stream and the oxidant stream nave an average velocity between the distal end of the partition that is less than the effective flame velocity.

45. The method of claim 23 wherein said fuel stream and said oxidant stream are separated prior to and mixed at said combustion chamber by a partition separating the fuel flow passage from the oxidant flow passage with said partition having a distal end terminating at the combustion chamber, further wherein the fuel stream and the oxidant stream have an average velocity between the distal end of the partition that is less than 80% of the effective flame velocity.

46. The method of claim 23 wherein said fuel stream and said oxidant stream are separated prior to and mixed at said combustion chamber by a partition separating the fuel flow passage from the oxidant flow passage with said partition having a distal end terminating at the combustion chamber, further wherein the fuel stream and the oxidant stream have an average velocity between the distal end of the partition that is less than 50% of the effective flame velocity.

47. The method of claim 23 wherein the step of initiating combustion further comprises the steps of:
   a) controlling the initial introduction of the fuel stream and the oxidant stream into the combustion chamber so that a mixture of oxidant and fuel with a low velocity is created,
   b) allowing the mixture of oxidant and fuel to pass through the flame nozzle,
   c) contacting the mixture of oxidant and fuel external to the flame nozzle with an ignition source to create a flame, d) allowing the flame to propagate back through the flame nozzle into the combustion chamber near the distal end of the fuel flow and gaseous oxidant flow passages, and e) increasing the velocity of the fuel stream and the velocity of the oxidant stream.

48. The method of claims 23 wherein the temperature of the combustion gases and any remaining fuel or oxidant accelerating through the converging/diverging flame nozzle is between 600 and 3000° C.

49. The method of claim 23 wherein the temperature of the combustion gases and any remaining fuel or oxidant accelerating through the converging/diverging flame nozzle is between 700 and 2000° C.

50. The method of claim 23 further comprising the feeding of a gaseous fuel through an axial central conduit.

51. The method of claim 23 further comprising the step of feeding of an oxidant through an axial central conduit.

52. The method of claim 23 further comprising the step of feeding a liquid fuel through an axial central conduit.

* * * * *